US012643389B2

(12) United States Patent

Yamashita et al.

(10) Patent No.: US 12,643,389 B2

(45) Date of Patent: Jun. 2, 2026

(54) ELECTRIFIED VEHICLE

(71) Applicant: TOYOTA JIDOSHA KABUSHIKI KAISHA, Toyota (JP)

(72) Inventors: Takahiro Yamashita, Toyota (JP); Ayako Hasegawa, Nagoya (JP); Hiroki Kunifuda, Chiryu (JP); Yumi Iraha, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 18/411,423

(22) Filed: Jan. 12, 2024

(65) Prior Publication Data

US 2024/0286482 A1 Aug. 29, 2024

(30) Foreign Application Priority Data

Feb. 28, 2023 (JP) ................................. 2023-030373

(51) Int. Cl.
B60K 6/405 (2007.10)
B60K 6/26 (2007.10)
B60K 6/46 (2007.10)

(52) U.S. Cl.
CPC ................ B60K 6/405 (2013.01); B60K 6/26 (2013.01); B60K 6/46 (2013.01)

(58) Field of Classification Search
CPC . B60K 6/26; B60K 6/40; B60K 6/405; B60K 6/46
See application file for complete search history.

(56) References Cited

U.S. PATENT DOCUMENTS

| | | | |
|---|---|---|---|
| 2004/0124332 A1* | 7/2004 | Takenaka | B60L 50/61 |
| | | | 903/952 |
| 2004/0150271 A1* | 8/2004 | Koga | H02K 9/19 |
| | | | 310/64 |
| 2010/0175933 A1* | 7/2010 | Yoshida | B60L 15/007 |
| | | | 180/65.1 |
| 2013/0049495 A1 | 2/2013 | Matsuo | |
| 2019/0297751 A1 | 9/2019 | Okuhata | |
| 2020/0161993 A1 | 5/2020 | Kishimoto et al. | |
| 2021/0257889 A1 | 8/2021 | Marukawa et al. | |

FOREIGN PATENT DOCUMENTS

| | | |
|---|---|---|
| JP | 2011-182480 A | 9/2011 |
| JP | 2019-170068 A | 10/2019 |
| JP | 2020-089255 A | 6/2020 |
| JP | 2021-132433 A | 9/2021 |
| JP | 2022-161294 A | 10/2022 |

* cited by examiner

*Primary Examiner* — Timothy Hannon

(74) *Attorney, Agent, or Firm* — SoraIP, Inc.

(57) ABSTRACT

The first fastening member, to which the engine-side end of the plate part that fixes a part of the power control device, is fastened is connected to the first wall part of the case body. In addition, the connection part between the housing to which the engine block is connected and the first wall part and the connection part between the first fastening member and the first wall part are located at positions facing each other with the first wall part interposed between the connection parts. Thus, the rigidity of the connection part between the housing and the case body is improved, bending of the case body starting from the connection part is suppressed, and vibration of the electromechanical integration unit is suppressed. Therefore, deterioration of NV in the electromechanical integration unit is able to be suppressed.

8 Claims, 7 Drawing Sheets

VERTICAL
DIRECTION   UPWARD
                      BACKWARD
                         FORWARD AND BACKWARD
                              DIRECTION
RIGHT SIDE ◄          ► LEFT
                   VEHICLE WIDTH
FORWARD              DIRECTION
        DOWNWARD

ELECTRIFIED VEHICLE

CROSS-REFERENCE TO RELATED APPLICATION

This application claims priority to Japanese Patent Application No. 2023-030373 filed on Feb. 28, 2023, incorporated herein by reference in its entirety.

BACKGROUND

1. Technical Field

The present disclosure relates to an electrified vehicle equipped with an engine and an electric motor.

2. Description of Related Art

An electrified vehicle including an electric motor, a power transmission device that transmits power from the electric motor to a drive wheel, a drive battery, and a power control device that controls electric power that is transmitted and received between the battery and the electric motor is well known. For example, a vehicle according to Japanese Unexamined Patent Application Publication No. 2019-170068 (JP 2019-170068 A) is the electrified vehicle described above. JP 2019-170068 A discloses a motor in which a rotor, a stator, and a motor drive device are housed in a case. The case includes a stator housing part housing the rotor and the stator and an inverter housing part housing the motor drive device that are partitioned by a wall part. The inverter housing part is located on the radially outer side of the stator housing part, for example, on the upper side in the vertical direction.

SUMMARY

Here, an electrified vehicle equipped including an engine, in addition to the electric motor, is also well known. In such an electrified vehicle, the power of the engine is input to, for example, a connecting member of the power transmission device that is connected to a crankshaft of the engine. On the other hand, the power control device is housed together with the power transmission device in the same case, and uses forced force (vibration) from the engine to easily vibrate in the direction in which the power of the engine is input to the power transmission device. Therefore, when a frequency component of the forced force of the engine overlaps with a resonance frequency band of the electric motor, power transmission device, and the power control device housed in the same case as an electromechanical integration unit, NV may be deteriorated. "NV" is a general term for noise and vibration generated in a vehicle, and represents at least one of the noise and the vibration in the vehicle.

The present disclosure has been made in view of the above circumstance, and the purpose is to provide an electrified vehicle that is able to suppress deterioration of NV in an electromechanical integration unit.

The gist of the first embodiment is as follows.

(a) An electrified vehicle includes an engine; an electric motor; a power transmission device that transmits power from the electric motor to a drive wheel; a drive battery; and a power control device that controls electric power that is transmitted and received between the battery and the electric motor.

(b) A drive device including the electric motor and the power transmission device, and the power control device are housed in the same case as an electromechanical integration unit, and power from the engine is input to the electromechanical integration unit.

(c) The case includes a housing to which an engine block of the engine is connected and that houses a part of the power transmission device including a connecting member connected to a crankshaft of the engine, and a case body that includes a first wall part to which an end of the housing on a side opposite to the engine is connected and that houses the electromechanical integration unit excluding a part of the power transmission device.

(d) The electromechanical integration unit includes a plate part that fixes at least a part of the power control device, and a first fastening member to which an end of the plate part on the engine side is fastened and that is connected to the first wall part.

(e) A connection part between the housing and the first wall part and a connection part between the first fastening member and the first wall part are located at positions facing each other with the first wall part interposed between the connection parts.

According to the first embodiment, the first fastening member to which an end of the plate part fixing a part of the power control device on the engine side is fastened is connected to the first wall part of the case body. In addition, the connection part between the housing to which the engine block is connected and the first wall part and the connection part between the first fastening member and the first wall part are located at positions facing each other with the first wall part interposed between the connection parts. Thus, the rigidity of the connection part between the housing and the case body is improved, bending of the case body starting from the connection part is suppressed, and vibration of the electromechanical integration unit is suppressed. Therefore, deterioration of NV in the electromechanical integration unit is able to be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, examples of the present disclosure will be described in detail with reference to the drawings.

Example 1

Figure 1:
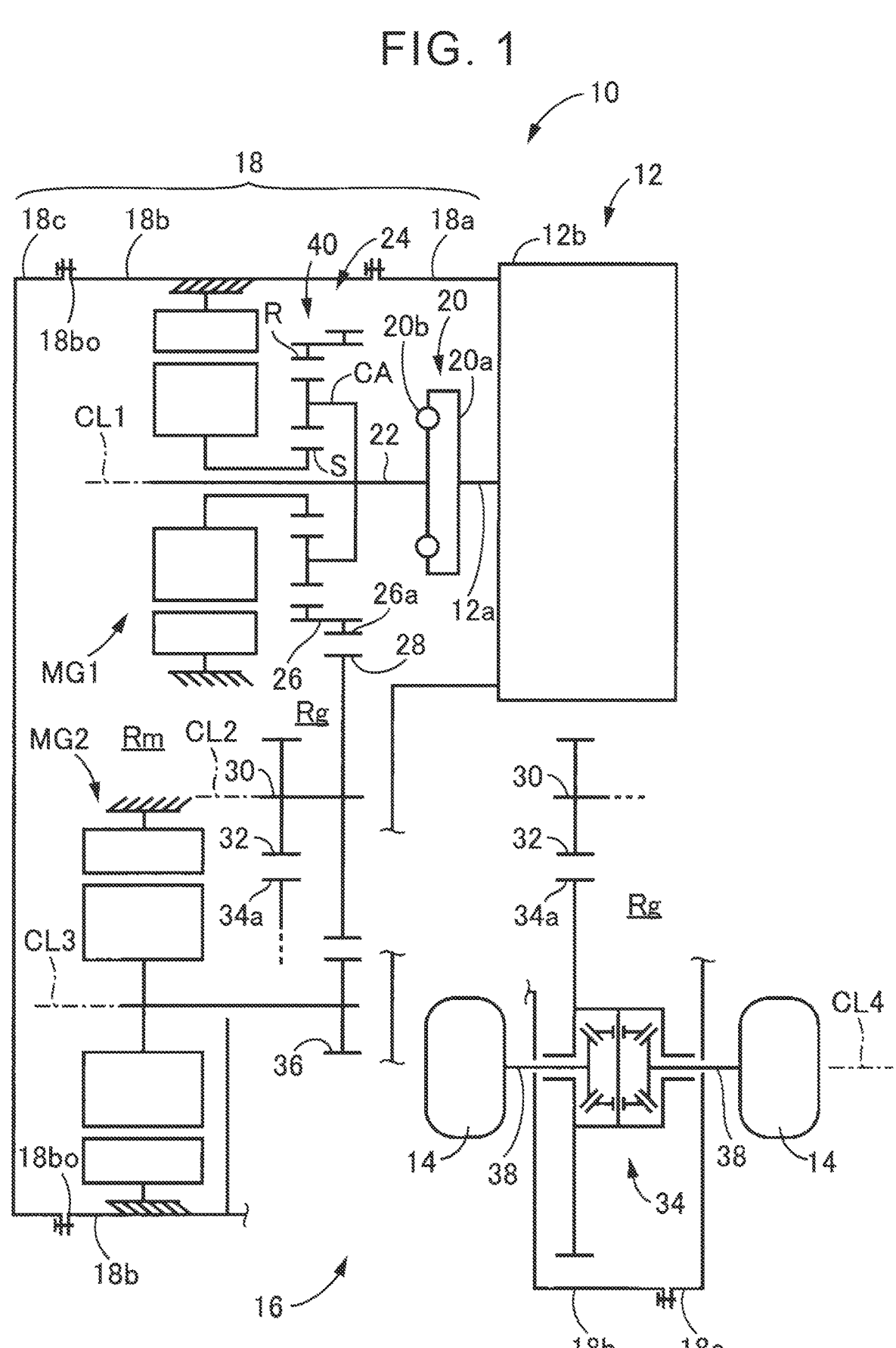
FIG. 1 is a diagram illustrating an example of a schematic configuration of an electrified vehicle to which the present disclosure is applied.

FIG. 1 is a diagram illustrating an example of a schematic configuration of an electrified vehicle 10 to which the present disclosure is applied. In FIG. 1, an electrified vehicle 10 is a hybrid electric vehicle that includes an engine 12 that functions as a power source and a second electric motor MG2 that is an electric motor that functions as a power source. The electrified vehicle 10 also includes a drive wheel 14, a power transmission device 16, and a first electric motor MG1.

Engine 12 is a known internal combustion engine. The drive wheels 14 are left and right wheels with respect to the forward and backward directions of the electrified vehicle 10. The power transmission device 16 is provided in a power transmission path between the engine 12 and the drive wheel 14 and in a power transmission path between the second electric motor MG2 and the drive wheel 14.

The first electric motor MG1 and the second electric motor MG2 are known rotating electrical machines that have the function of a motor that generates mechanical power from electric power and a function of a generator that generates electric power from mechanical power, respectively. It is a so-called motor generator. The first electric motor MG1 and the second electric motor MG2 are provided in a non-rotatable case 18, which is a non-rotating member attached to the vehicle body.

The power transmission device 16 includes a connecting member 20, an input shaft 22, a transmission section 24, a composite gear 26, a driven gear 28, a driven shaft 30, a final gear 32, a differential gear 34, a reduction gear 36, etc. within a case 18. The connecting member 20 is a member connected to the crankshaft 12a of the engine 12, and includes, for example, a flywheel 20a connected to the crankshaft 12a, and a damper 20b connected to the flywheel 20a. The input shaft 22 functions as an input rotating member of the transmission section 24. The input shaft 22 is connected to a damper 20b, and is connected to the crankshaft 12a via a connecting member 20 or the like. The transmission section 24 is connected to the input shaft 22. The composite gear 26 is a rotating body on the output side of the transmission section 24. The composite gear 26 has a drive gear 26a formed on a part of its outer peripheral surface. Drive gear 26a is an output rotating member of transmission section 24. Driven gear 28 meshes with drive gear 26a. The driven shaft 30 fixes the driven gear 28 and the final gear 32 so that they cannot rotate relative to each other. The final gear 32 has a smaller diameter than the driven gear 28, and meshes with a differential ring gear 34a of a differential gear 34. The reduction gear 36 has a smaller diameter than the driven gear 28 and meshes with the driven gear 28. A rotor shaft of a second electric motor MG2 is connected to the reduction gear 36, and the second electric motor MG2 is connected so as to be capable of transmitting power. The power transmission device 16 also includes a pair of drive shafts 38 connected to a differential gear 34 and the like.

The power transmission device 16 configured in this manner is suitably used in an FF (front engine/front drive) type vehicle or an RR (rear engine/rear drive) type vehicle. Power transmission device 16 transmits power output from engine 12 to driven gear 28 via transmission section 24. Further, the power transmission device 16 transmits the power output from the second electric motor MG2 to the driven gear 28 via the reduction gear 36. The power transmission device 16 transmits the power transmitted to the driven gear 28 to the drive wheel 14 via a driven shaft 30, a final gear 32, a differential gear 34, a drive shaft 38, etc. in this order.

The transmission section 24 includes a first electric motor MG1 and a differential mechanism 40. The differential mechanism 40 is a known single pinion type planetary gear device including a sun gear S, a carrier CA, and a ring gear R. The sun gear S is connected to the rotor shaft of the first electric motor MG1, and is connected to the first electric motor MG1 so that power can be transmitted thereto. The carrier CA is connected to an input shaft 22, and is connected to the engine 12 via the input shaft 22 and the like so that power can be transmitted thereto. The ring gear R is formed on a part of the inner peripheral surface of the composite gear 26, and is integrally connected to the drive gear 26a.

The differential mechanism 40 functions as a differential mechanism that is connected to the engine 12 so as to transmit power and that generates a differential operation. The first electric motor MG1 is a differential electric motor connected to the differential mechanism 40 so as to transmit power. The differential mechanism 40 is a power splitting mechanism that mechanically splits the power of the engine 12 input into the carrier CA to the first electric motor MG1 and the drive gear 26a. The transmission section 24 is a known electric transmission mechanism in which the differential state of the differential mechanism 40 is controlled by controlling the operating state of the first electric motor MG1.

The power transmission device 16 has a first axis CL1, a second axis CL2, a third axis CL3, and a fourth axis CL4. These four axes CL1, CL2, CL3, CL4 are parallel to each other. The first axis CL1 is the axis of the input shaft 22 and the rotor shaft of the first electric motor MG1. That is, the first axis CL1 is the rotation axis of the first electric motor MG1. The transmission section 24 and the first electric motor MG1 are arranged around the first axis CL1. The second axis CL2 is the axis of the driven shaft 30. The driven gear 28 and the final gear 32 are arranged around the second axis CL2. That is, the second axis CL2 is the rotation axis of the driven gear 28, the driven shaft 30, and the final gear 32. The third axis CL3 is the axial center of the rotor shaft of the second electric motor MG2. That is, the third axis CL3 is the rotation axis of the second electric motor MG2. The second electric motor MG2 and the reduction gear 36 are arranged around the third axis CL3. The fourth axis CL4 is the axial center of the drive shaft 38 and the axial center of the differential gear 34. That is, the fourth axis CL4 is the rotation axis of the differential gear 34. The differential gear 34 is arranged around the fourth axis CL4.

The case 18 includes a housing 18a, a case body 18b, and a cover 18c. An engine block 12b of the engine 12 is connected to an open portion of the housing 18a on the engine 12 side. The housing 18a and the case body 18b are integrally connected by fasteners such as bolts so that the open part of the housing 18a on the side opposite to the engine 12 and the open part of the case body 18b on the engine 12 side are aligned. The case body 18b and the cover 18c are integrally connected by a fastener so that the open portion of the case body 18b on the side opposite to the engine 12 is closed by the cover 18c. The case body 18b is a case that includes a partition wall (not shown) that partitions a gear chamber Rg that accommodates the transmission section 24, driven gear 28, etc., and a motor chamber Rm that accommodates the first electric motor MG1 and the second electric motor MG2. It is. The case body 18b and the housing 18a form a gear chamber Rg. The case body 18b and the cover 18c form a motor chamber Rm. Further, the housing 18a accommodates a portion of the power transmission device 16 including the connecting member 20. The cover 18c is a case cover provided to close an opening 18bo of the case body 18b on the side opposite to the engine 12.

Figure 2:
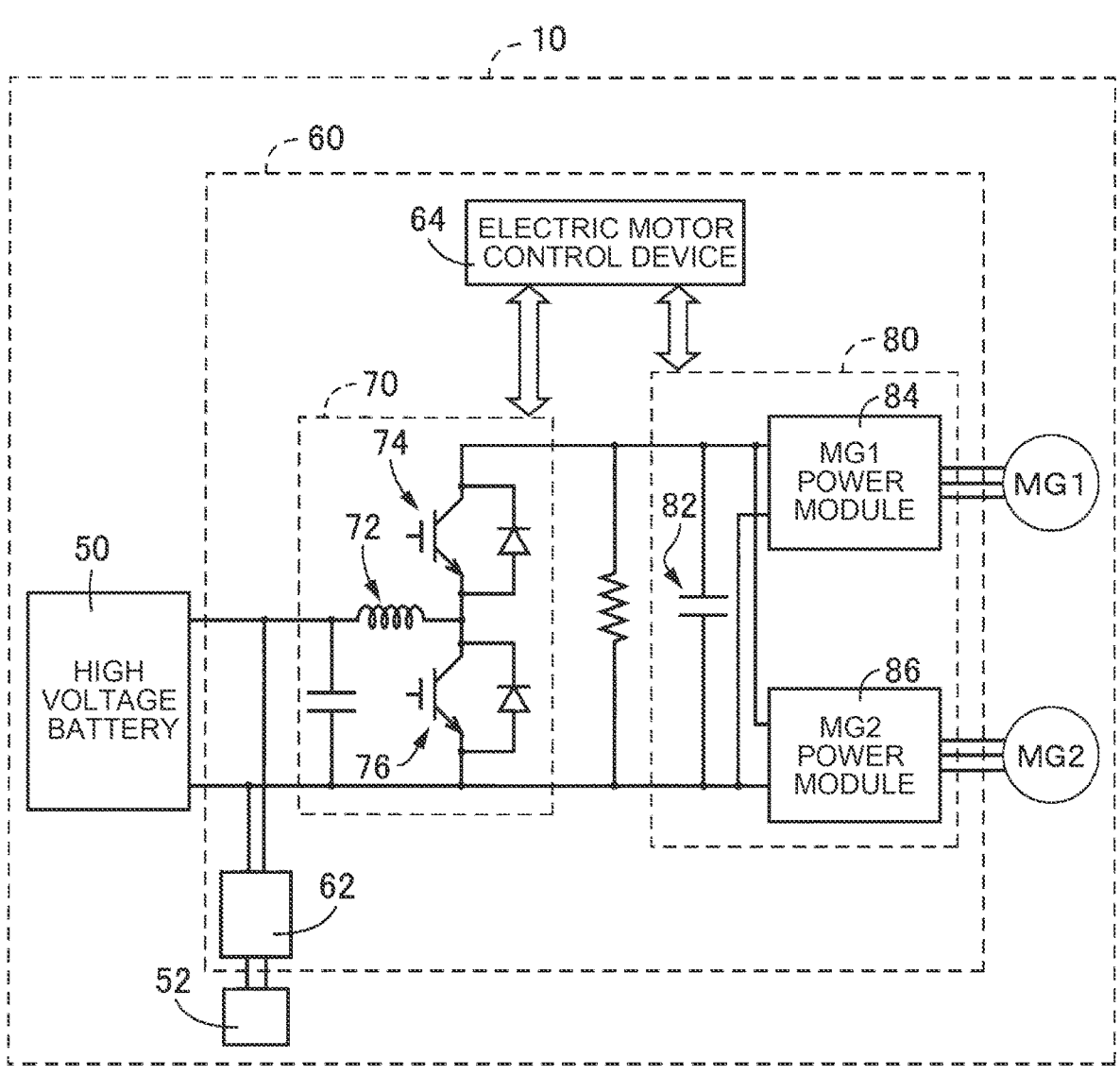
FIG. 2 is a diagram illustrating an example of an electrical configuration related to control of an electric motor, etc.

FIG. 2 is a diagram illustrating an example of an electrical configuration related to control of the first electric motor MG1 and the second electric motor MG2. In FIG. 2, the electrified vehicle 10 further includes a high voltage battery 50, an auxiliary battery 52, a power control unit 60, and the like.

The high voltage battery 50 is a chargeable/dischargeable DC power source, and is, for example, a secondary battery such as a nickel metal hydride secondary battery or a lithium ion battery. High voltage battery 50 is connected to power control unit 60. The stored power is supplied from the high voltage battery 50 to, for example, the second electric motor MG2 via the power control unit 60. Further, the high-voltage battery 50 is supplied with electric power generated by the power generation control of the first electric motor MG1 and electric power generated by the regeneration control of the second electric motor MG2 via the power control unit 60. The high voltage battery 50 is a driving battery.

The power control unit 60 includes a DCDC converter 62, an electric motor control device 64, a boost converter 70, an inverter 80, and the like. The power control unit 60 is a power control device that controls power transferred between the high-voltage battery 50 and the first electric motor MG1 and the second electric motor MG2.

DCDC converter 62 is connected to high voltage battery 50. The DCDC converter 62 functions as a charging device that charges the auxiliary battery 52 by lowering the voltage of the high voltage battery 50 to a voltage equivalent to that of the auxiliary battery 52. The auxiliary battery 52 supplies power to operate the auxiliary equipment provided in the electrified vehicle 10. The auxiliary battery 52 supplies power to operate various electronic control devices included in the electrified vehicle 10, including an electric motor control device 64.

Boost converter 70 includes a reactor 72, two switching elements 74 and 76, and the like. The boost converter 70 is a buck-boost circuit that has a function of boosting the voltage of the high-voltage battery 50 and supplying it to the inverter 80, and a function of stepping down the voltage converted to direct current by the inverter 80 and supplying it to the high-voltage battery 50.

The inverter 80 includes a capacitor 82, an MG1 power module 84, an MG2 power module 86, and the like. The MG1 power module 84 and the MG2 power module 86 each include switching elements similar to the switching elements 74 and 76, and the like. Inverter 80 converts direct current from boost converter 70 into alternating current for driving first electric motor MG1 and second electric motor MG2. The inverter 80 converts the alternating current generated by the first electric motor MG1 using the power of the engine 12 and the alternating current generated by the second electric motor MG2 using regenerative braking into direct current. The inverter 80 supplies the alternating current generated by the first electric motor MG1 as driving power to the second electric motor MG2 depending on the running state.

The electric motor control device 64 controls boost converter 70 and inverter 80. For example, the electric motor control device 64 converts the direct current from the high voltage battery 50 into alternating current used by the first electric motor MG1 and the second electric motor MG2, respectively. The electric motor control device 64 drives the first electric motor MG1 in order to ensure the amount of power generation necessary for supplying power to the second electric motor MG2 and charging the high voltage battery 50. The electric motor control device 64 drives the second electric motor MG2 based on an output request value corresponding to the driver's requested torque. The electric motor control device 64 causes the second electric motor MG2 to function as a generator depending on the required amount of regenerative braking.

Figure 3:
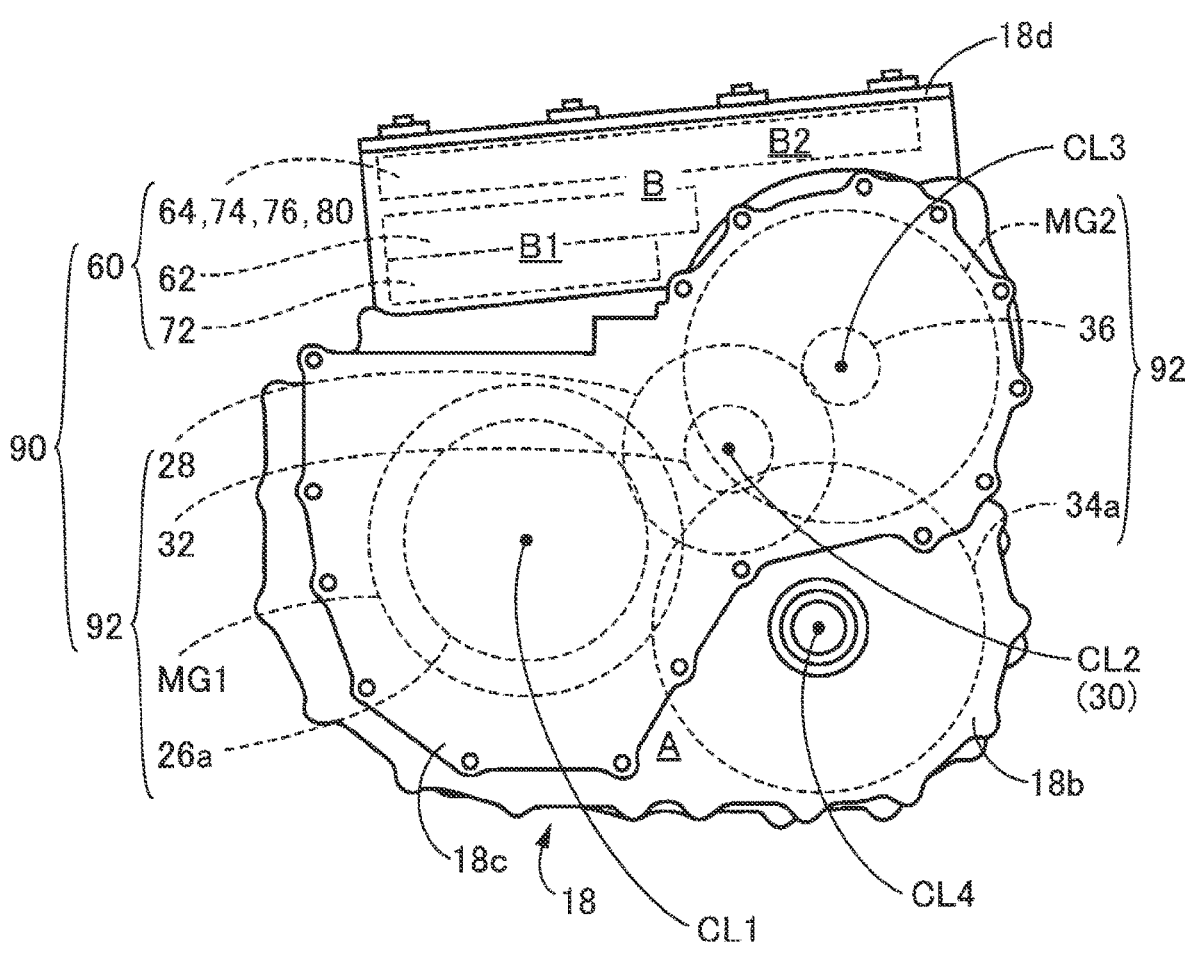
FIG. 3 is a diagram illustrating an example of a schematic configuration of an electromechanical integration unit.
Figure 3:
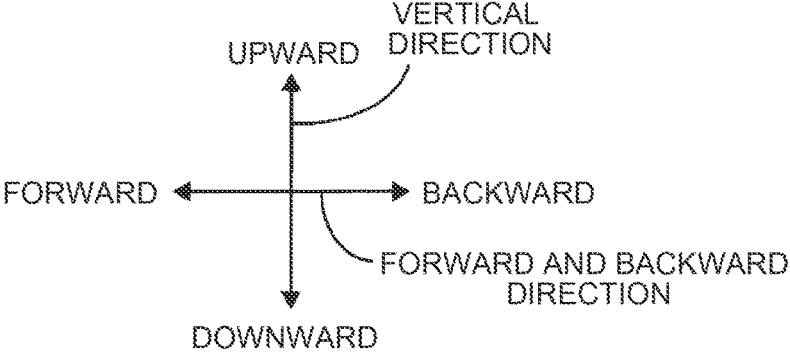
Figure 4:
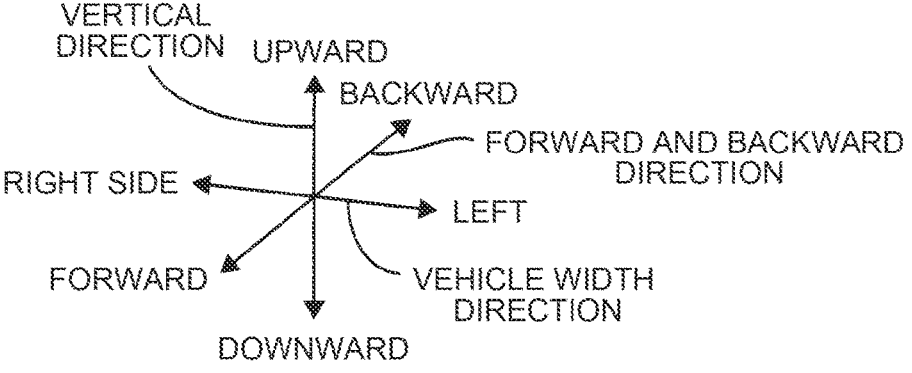
FIG. 4 is a diagram illustrating an example of an electrified vehicle in which an engine and an electromechanical integration unit are mounted.

FIG. 3 is a diagram illustrating an example of a schematic configuration of the hybrid drive unit 90. FIG. 4 is a diagram illustrating an example of a state in which the engine 12 and the hybrid drive unit 90 are mounted on the electrified vehicle 10. FIG. 4 is a perspective view of the electrified vehicle 10 from the front and left side. 3 and 4, the transaxle 92 and the power control unit 60 are housed in the same case 18 as the hybrid drive unit 90. The hybrid drive unit 90 is a unit in which the transaxle 92 and the power control unit 60 are integrated, that is, an electromechanical integration unit. Hybrid drive unit 90 is located adjacent to engine 12. Power from engine 12 is input to hybrid drive unit 90. Note that the vertical direction, longitudinal direction, and vehicle width direction in the figure indicate the directions when the electrified vehicle 10 is mounted.

In addition to the housing 18a, case body 18b, and cover 18c described above, the case 18 further includes a protection plate 18d. The case body 18b has a bottom wall and side walls extending vertically upward from the outer peripheral edge of the bottom wall on the front side and the rear side in the forward and backward movement direction, and is open at the top in the vertical direction. The protection plate 18d is a plate-shaped member that closes the vertically upper opening of the case body 18b. The case body 18b has a partition (not shown) inside, and the partition partitions the inside into two spaces: a vertically lower space A and a vertically upper space B.

The transaxle 92 is a drive device that includes the power transmission device 16 (26a, 28, 32, 34a, 36, etc.), a first electric motor MG1, and a second electric motor MG2. When the transaxle 92 is installed in the electrified vehicle 10, the transaxle 92 is accommodated in the space A in the vertical lower part of the case body 18b or in the housing 18a.

When the power control unit 60 is installed in the electrified vehicle 10, the power control unit 60 is housed in a space B in the vertical upper part of the case body 18b. The space B above the vertical direction includes a surplus space B1 created by the arrangement of the first electric motor MG1 and the second electric motor MG2, and a space B2 above the second electric motor MG2 in the vertical direction. The length of the surplus space B1 in the longitudinal direction is shorter than that of the space B2.

A reactor 72, which is relatively short in length among the power control unit 60, is housed in the vertically lower portion of the surplus space B1. Furthermore, in consideration of case of replacement, a DCDC converter 62 is housed in the vertically upper portion of the surplus space B1. Further, the space B2 accommodates an electric motor control device 64, switching elements 74 and 76, an inverter 80, and the like.

Referring to FIG. 3, when the transaxle 92 is installed in the electrified vehicle 10, each of the first axis CL1, the second axis CL2, the third axis CL3, and the fourth axis CL4 is in the longitudinal direction of the electrified vehicle 10. It is arranged parallel to the horizontal direction, which is perpendicular to the. Further, when the transaxle 92 is installed in the electrified vehicle 10, the positions of each of the first axis CL1, the second axis CL2, the third axis CL3, and the fourth axis CL4 are vertically upward to downward in the order of the second electric motor MG2, the driven shaft 30, the first electric motor MG1, and the differential gear 34, and from the front to the rear in the forward/reverse direction in the order of the first electric motor MG1, the driven shaft 30, the differential gear 34, and the second electric motor MG2. Thereby, the vertical physique of the transaxle 92 is reduced while ensuring appropriate distances between the first axis CL1, the second axis CL2, the third axis CL3, and the fourth axis CL4. Therefore, a surplus space B1 is created by the arrangement of the first electric motor MG1 and the second electric motor MG2, and a space B2 is created above the second electric motor MG2 in the vertical direction. The power control unit 60 is mounted in this space B (B1+B2).

The power control unit 60 is arranged vertically above the transaxle 92 when mounted on the electrified vehicle 10. In addition, the power control unit 60 is disposed in a location in which a vertically lower portion in the power control unit 60 overlaps the transaxle 92, particularly the vertically upper portion of the second electric motor MG2, when viewed horizontally, particularly in the forward and backward direction. In other words, when the power control unit 60 is installed in the electrified vehicle 10, the vertically lower portion of the power control unit 60 is arranged vertically above the first electric motor MG1. Further, a vertically lower portion of the power control unit 60 includes a reactor 72.

The power control unit 60 is mounted in the space created by reducing the vertical size of the transaxle 92, and a space is created above the hybrid drive unit 90 in the vertical direction.

Figure 7:
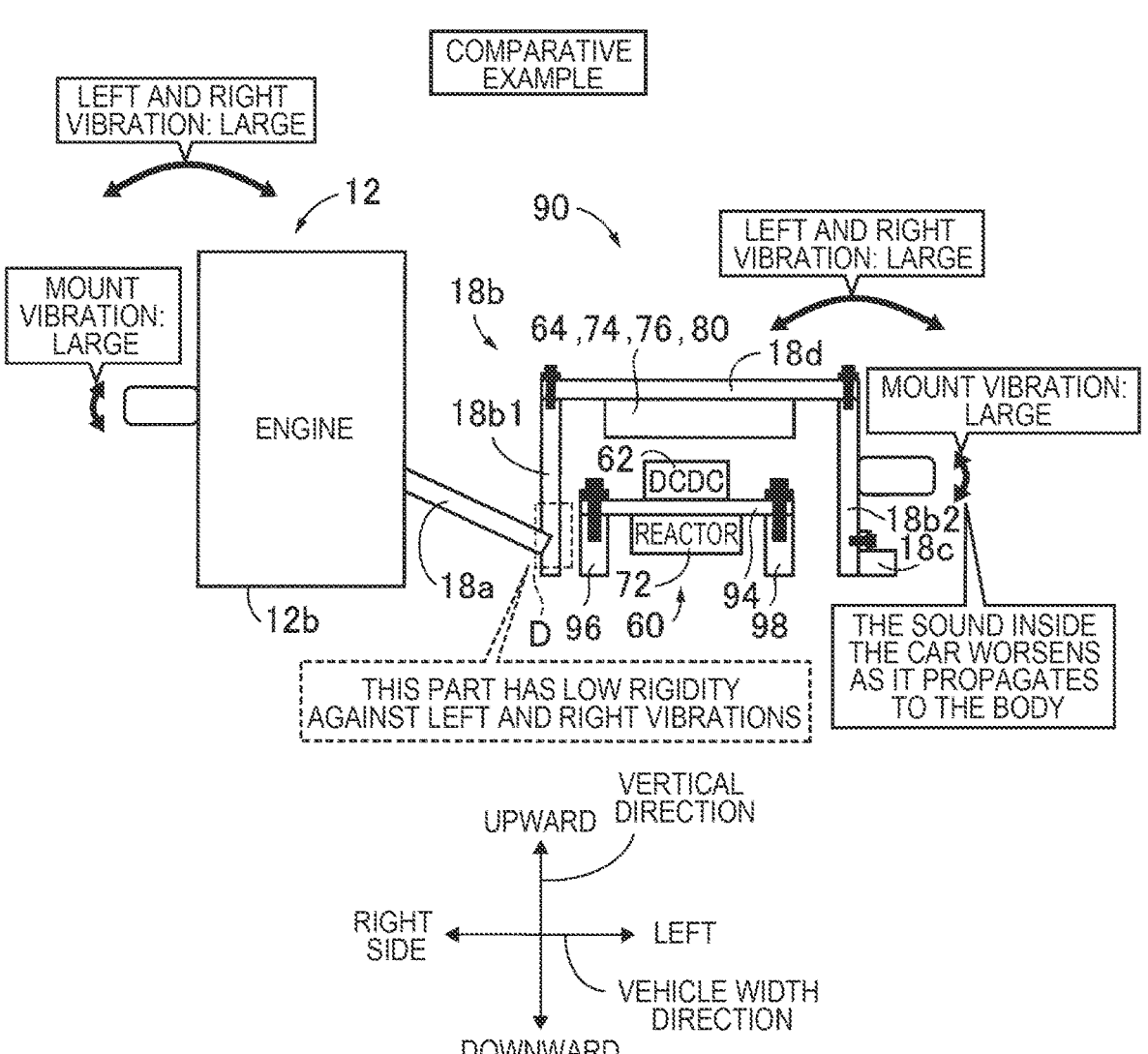
FIG. 7 is a diagram illustrating the configuration of the vertically upper portion of the case body, and is a diagram illustrating a comparative example with respect to the present example.

By the way, since the hybrid drive unit 90 adopts an integrated mechanical and electrical structure, left-right vibration is generated in which the case 18, especially the vertical upper part of the case body 18b, vibrates in the vehicle width direction due to the force generated by the engine 12 as a vibration source (see arrow C in FIG. 4). If the resonant frequency band of the hybrid drive unit 90 due to this left-right vibration overlaps with the frequency component of the forced force of the engine, there is a possibility that NV will be worsened. Furthermore, in the hybrid drive unit 90, vibrations due to the forced force of the engine 12 are more likely to propagate to the power control unit 60, compared to a case where the transaxle 92 and the power control unit 60 are housed in separate cases, and the power Parts of the power control unit 60 tend to vibrate. In addition, with respect to the above-mentioned left-right vibration, as shown in FIG. 7, if the rigidity of the broken line portion D is low, the case body 18b is likely to bend starting from the broken line portion D, resulting in increased left-right vibration. Therefore, vibrations in the mounts that support the engine 12 and the hybrid drive unit 90 become large, and there is a possibility that NV may be deteriorated.

FIG. 7 is a diagram illustrating the configuration of the vertically upper portion of the case body 18b, and is a sectional view when looking inside the case body 18b from the front of the electrified vehicle 10. In FIG. 7, the hybrid drive unit 90 includes a DCDC plate 94, a first fastening member 96, a second fastening member 98, and the like. DCDC plate 94 is a plate part that fixes at least a portion of power control unit 60. For example, in the DCDC plate 94, the DCDC converter 62 is fixed to the upper surface in the vertical direction, and the reactor 72 is fixed to the lower surface in the vertical direction. The first fastening member 96 is fastened to the end of the DCDC plate 94 on the engine 12 side. The second fastening member 98 is fastened to the end of the DCDC plate 94 on the side opposite to the engine. The case body 18b has a first wall part 18b1 to which an end of the housing 18a on the opposite side from the engine 12 is connected. Further, the case body 18b has a second wall part 18b2 located on the opposite side of the first wall part 18b1 with respect to the DCDC plate 94. The cover 18c is connected to the second wall part 18b2. The case body 18b houses the hybrid drive unit 90, excluding a part of the power transmission device 16 housed in the housing 18a. FIG. 7 is a diagram showing a comparative example to this example. In the comparative example shown in FIG. 7, the first fastening member 96 is not connected to the first wall part 18b1. Therefore, in the comparative example, the rigidity of the broken line portion D is low against left and right vibrations, as described above.

FIGS. 5A, 5B, 5C, and 5D are diagrams illustrating the configuration of the vertically upper portion of the case body 18b, and are diagrams showing an example of the present embodiment.

Figures 5A, 5B, 5C, 5D:
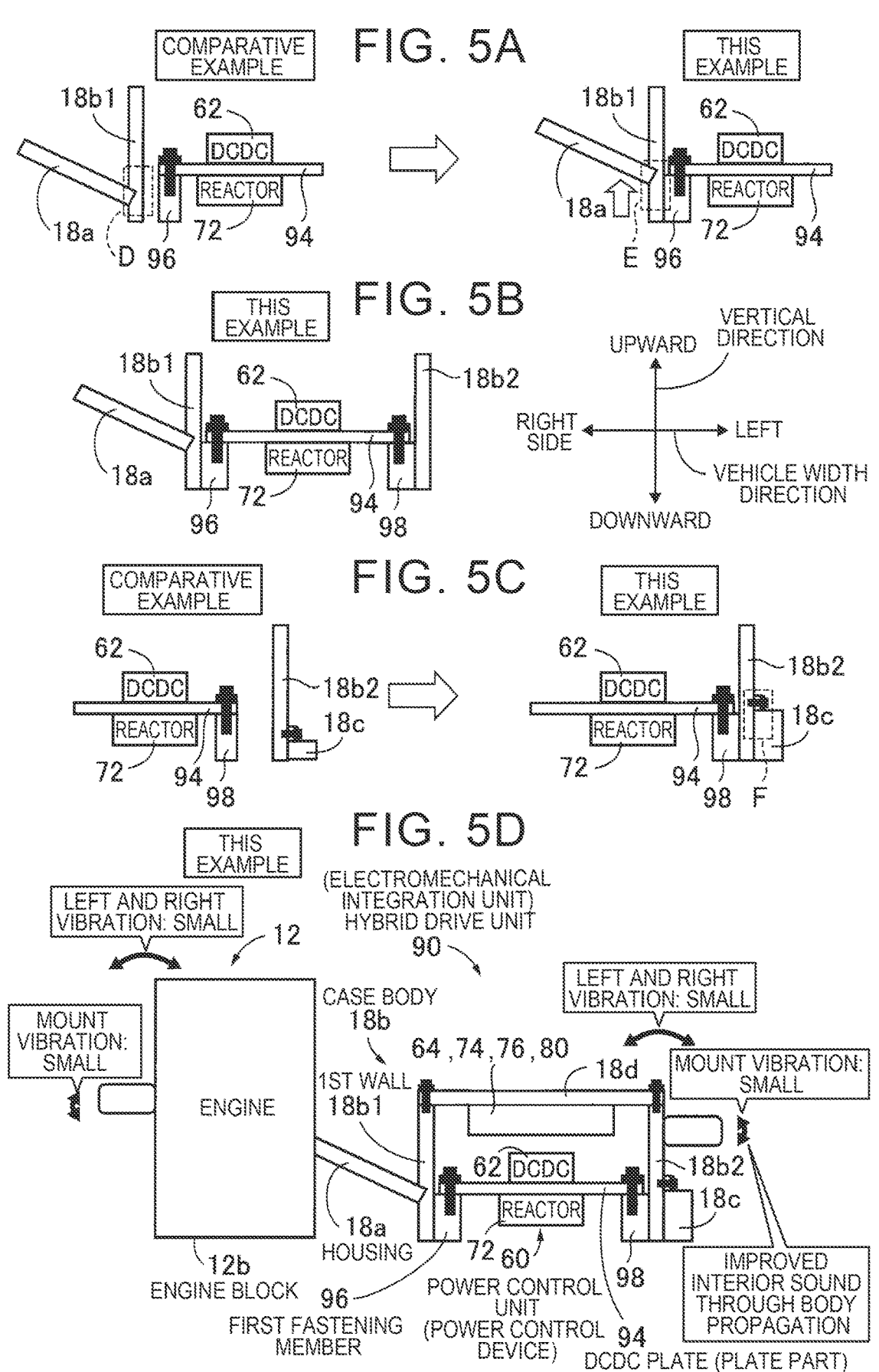
FIG. 5A is a diagram illustrating the configuration of the vertically upper part of the case body, and is a diagram illustrating an example of the present embodiment.
FIG. 5B is a diagram illustrating the configuration of the vertical upper part of the case body, and is a diagram illustrating an example of the present embodiment.
FIG. 5C is a diagram illustrating the configuration of the vertically upper part of the case body, and is a diagram showing an example of the present embodiment.
FIG. 5D is a diagram illustrating the configuration of the vertically upper part of the case body, and is a diagram illustrating an example of the present embodiment.

As shown in FIG. 5A, in this embodiment, the first fastening member 96 is connected to the first wall part 18b1. In addition, in this embodiment, the connection part between the housing 18a and the first wall part 18b1 and the connection part between the first fastening member 96 and the first wall part 18b1 are in positions opposed to each other with the first wall part 18b1 in between. As a result, the rigidity of the connection part between the housing 18a and the case body 18b (see broken line portion E) is made higher than the rigidity of the broken line portion D, and bending of the case body 18b starting from the connection part is suppressed.

As shown in FIG. 5B, in this embodiment, the second fastening member 98 is connected to the second wall part 18b2. Thereby, the DCDC plate 94 is made to function as a beam connecting the first wall part 18b1 and the second wall part 18b2 in the case body 18b.

As shown in FIG. 5C, in this embodiment, the connection part between the cover 18c and the second wall part 18b2 and the connection part between the second fastening member 98 and the second wall part 18b2 are the second wall part 18b2. They are located opposite each other. As a result, the rigidity of the cover 18c is high, so that the rigidity of the connection part (see broken line portion F) between the cover 18c and the second wall part 18b2 is increased.

FIG. 5D shows a cross-sectional view similar to FIG. 7. In FIG. 5D, the configuration shown in FIGS. 5A to 5C suppresses left-right vibration of the case body 18*b* and suppresses vibration in the mount. Therefore, NV in the electrified vehicle 10 is improved.

As described above, according to this embodiment, the first fastening member 96 is connected to the first wall part 18*b*1. In addition, the connection part between the housing 18*a* and the first wall part 18*b*1 and the connection part between the first fastening member 96 and the first wall part 18*b*1 are located at opposite positions with the first wall part 18*b*1 interposed therebetween. This increases the rigidity of the connection part between the housing 18*a* and the case body 18*b*, suppresses bending of the case body 18*b* starting from the connection part, and suppresses vibration of the hybrid drive unit 90. Therefore, deterioration of NV in hybrid drive unit 90 can be suppressed.

Further, according to this embodiment, the hybrid drive unit 90 includes a second fastening member 98 connected to the second wall part 18*b*2. As a result, the DCDC plate 94 is made to function as a beam in the case body 18*b*, and the rigidity of the connection part between the housing 18*a* and the case body 18*b* is further increased, and bending of the case body 18*b* starting from the connection part is further suppressed. Therefore, vibrations of the hybrid drive unit 90 are further suppressed.

The DCDC plate 94 is a component originally included in the hybrid drive unit 90. In this embodiment, by utilizing this DCDC plate 94, bending of the case body 18*b* starting from the connection part between the housing 18*a* and the case body 18*b* is suppressed without increasing the number of countermeasure parts.

Further, according to the present embodiment, the connection part between the cover 18*c* and the second wall part 18*b*2 and the connection part between the second fastening member 98 and the second wall part 18*b*2 are in positions opposed to each other with the second wall part 18*b*2 in between. As a result, the rigidity of the connection part between the cover 18*c* and the second wall part 18*b*2 is increased, bending of the case body 18*b* is more reliably suppressed, and vibration of the hybrid drive unit 90 is further reliably suppressed.

Next, other embodiments of the disclosure will be described. In the following description, the same reference numerals are given to the parts common to the embodiments, and the description thereof will be omitted.

Example 2

FIGS. 6A, 6B, 6C, and 6D are diagrams illustrating the configuration of the vertically upper portion of the case body 18*b*, and are diagrams showing another example of the present embodiment.

Figures 6A, 6B, 6C, 6D:
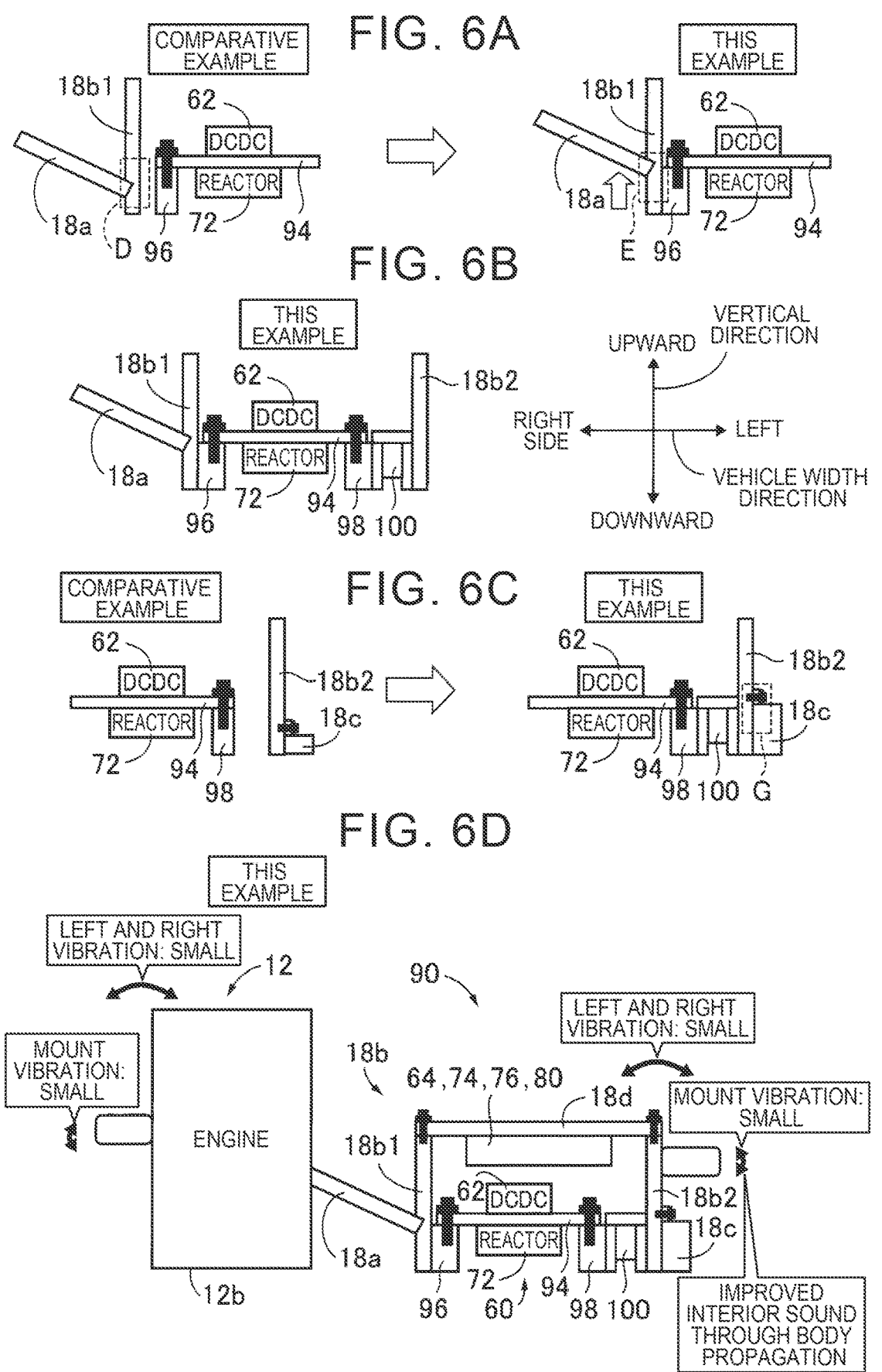
FIG. 6A is a diagram illustrating the configuration of the vertical upper part of the case body, and is a diagram illustrating another example of the present embodiment.
FIG. 6B is a diagram illustrating the configuration of the vertical upper part of the case body, and is a diagram illustrating another example of the present embodiment.
FIG. 6C is a diagram illustrating the configuration of the vertical upper part of the case body, and is a diagram illustrating another example of this embodiment.
FIG. 6D is a diagram illustrating the configuration of the vertically upper part of the case body, and is a diagram illustrating another example of the present embodiment.

Since FIG. 6A is the same as FIG. 5A, the description thereof will be omitted.

As shown in FIG. 6B, in this embodiment, the hybrid drive unit 90 includes an intermediary member 100 interposed between the second fastening member 98 and the second wall part 18*b*2. Therefore, in this embodiment, the second fastening member 98 is connected to the second wall part 18*b*2 via the intermediary member 100. The intermediary member 100 is a member originally provided in the hybrid drive unit 90, and is not a newly provided member. The intermediary member 100 is, for example, a terminal block for connecting the first electric motor MG1 or the second electric motor MG2 and the power control unit 60. That is, in this embodiment, the arrangement position of the intermediary member 100 originally provided in the hybrid drive unit 90 is changed, and it is utilized as a bridging member that connects the second fastening member 98 and the second wall part 18*b*2. Thereby, the DCDC plate 94 is made to function as a beam connecting the first wall part 18*b*1 and the second wall part 18*b*2 in the case body 18*b*.

As shown in FIG. 6C, in this embodiment, the connection part between the cover 18*c* and the second wall part 18*b*2 and the connection part between the intermediary member 100 and the second wall part 18*b*2 sandwich the second wall part 18*b*2. They are located opposite each other. Further, the connection part between the intermediary member 100 and the second wall part 18*b*2 and the connection part between the intermediary member 100 and the second fastening member 98 are located at opposite positions with the intermediary member 100 interposed therebetween. As a result, since the cover 18*c* has high rigidity, the rigidity of the connection part (see broken line portion G) between cover 18*c* and the second wall part 18*b*2 is increased.

FIG. 6D shows a cross-sectional view similar to FIG. 7. In FIG. 6D, the configuration shown in FIGS. 6A to 6C suppresses the left-right vibration of the case body 18*b* and suppresses the vibration in the mount. Therefore, NV in the electrified vehicle 10 is improved.

As described above, according to this embodiment, the same effects as in the first embodiment described above can be obtained. For example, according to this embodiment, deterioration of NV in the hybrid drive unit 90 can be suppressed.

Further, according to this embodiment, the second fastening member 98 is connected to the second wall part 18*b*2 via the intermediary member 100. This allows the DCDC plate 94 to function properly as a beam in the case body 18*b*, further increases the rigidity of the connection part between the housing 18*a* and the case body 18*b*, and further suppresses the case body 18*b* from bending from the connection part. Therefore, vibrations of the hybrid drive unit 90 are further suppressed.

The DCDC plate 94 and the intermediary member 100 are components originally included in the hybrid drive unit 90. In this embodiment, by utilizing the DCDC plate 94 and the intermediary member 100, bending of the case body 18*b* starting from the connection part between the housing 18*a* and the case body 18*b* is suppressed without increasing the number of countermeasure parts.

Further, according to the present embodiment, the connection part between the cover 18*c* and the second wall part 18*b*2 and the connection part between the intermediary member 100 and the second wall part 18*b*2 are located at opposing positions with the second wall part 18*b*2 interposed therebetween. Further, the connection part between the intermediary member 100 and the second wall part 18*b*2 and the connection part between the intermediary member 100 and the second fastening member 98 are located at opposite positions with the intermediary member 100 interposed therebetween. As a result, the rigidity of the connection part between the cover 18*c* and the second wall part 18*b*2 is increased, bending of the case body 18*b* is more reliably suppressed, and vibration of the hybrid drive unit 90 is further reliably suppressed.

Although the examples of the present disclosure have been described in detail with reference to the drawings, the present disclosure also applies to other modes.

For example, in the above-described embodiment, when the transaxle 92 is mounted on the electrified vehicle 10, the positions of the first axis CL1, the second axis CL2, the third axis CL3, and the fourth axis CL4 are arranged in the order of the first electric motor MG1, the driven shaft 30, the differential gear 34, and the second electric motor MG2 from the front to the rear in the forward and backward directions, but the present disclosure is not limited to this embodiment. For example, when the transaxle 92 is installed in the electrified vehicle 10, the positions of the first axis CL1, the second axis CL2, the third axis CL3, and the fourth axis CL4 may be arranged in an order of the first electric motor MG1, the driven shaft 30, the differential gear 34, and the second electric motor MG2 from the rear to the front in the forward and backward movement direction.

Further, in the above embodiment, the electrified vehicle 10 is a hybrid electric vehicle including the engine 12, the first electric motor MG1, and the second electric motor MG2, but the present disclosure is not limited to this embodiment. For example, an electrified vehicle is a series hybrid electric vehicle that includes an engine, a driving electric motor that functions as a power source, and an electric motor that is connected to the engine so as to transmit power and that generates electric power using the engine's power. It's okay. In such a series hybrid electric vehicle, the power transmission path between the engine and the drive wheels may be disconnected or connected by actuation of the clutch. Alternatively, an electrified vehicle is a parallel hybrid electric vehicle that includes an engine, a power transmission device that transmits power from the engine to drive wheels, and an electric motor that transmits power to the drive wheels via the power transmission device. It's okay.

Furthermore, in the above embodiment, the electrified vehicle 10 may be a so-called plug-in hybrid electric vehicle that can charge the high voltage battery 50 with power from an external power source. In the plug-in hybrid electric vehicle, the downsizing of the hybrid drive unit 90 increases the degree of freedom in the placement of the charger and the like.

It should be noted that the embodiment described above is merely one embodiment, and the present disclosure can be implemented in a mode in which various changes and improvements are made based on the knowledge of those skilled in the art.

What is claimed is:

1. An electrified vehicle comprising:
an engine;
an electric motor;
a power transmission device that transmits power from the electric motor to a drive wheel;
a drive battery; and
a power control device that controls electric power that is transmitted and received between the drive battery and the electric motor, the power control device including a DC-DC converter and a reactor, wherein:
a drive device including the electric motor and the power transmission device, and the power control device are housed in a single case as an electromechanical integration unit, and power from the engine is input to the electromechanical integration unit;
the single case includes a housing to which an engine block of the engine is connected and that houses a part of the power transmission device including a connecting member connected to a crankshaft of the engine, and a case body that includes a first wall part to which an end of the housing on a side opposite to the engine is connected and that houses the electromechanical integration unit excluding the part of the power transmission device;

the electromechanical integration unit includes a plate part that fixes at least a part of the power control device, and a first fastening member to which an end of the plate part on an engine side is fastened and that is connected to the first wall part;
a first connection part between the housing and the first wall part and a second connection part between the first fastening member and the first wall part are located at positions facing each other with the first wall part interposed between the first connection part and the second connection part; and
the DC-DC converter is fixed to an upper surface of the plate part in a height direction of the electrified vehicle, and the reactor is fixed to a lower surface of the plate part in the height direction.

2. The electrified vehicle according to claim 1, wherein:
the case body includes a second wall part that is located on an opposite side of the plate part from the first wall part; and
the electromechanical integration unit includes a second fastening member to which an end of the plate part on the side opposite to the engine is fastened and that is connected to the second wall part.

3. The electrified vehicle according to claim 2, wherein:
the single case includes a cover that closes an opening of the case body on the side opposite to the engine and that is connected to the second wall part; and
a third connection part between the cover and the second wall part and a fourth connection part between the second fastening member and the second wall part are located at positions facing each other with the second wall part interposed between the third connection part and the fourth connection part.

4. The electrified vehicle according to claim 2, wherein:
the electromechanical integration unit includes an intermediary member that is interposed between the second fastening member and the second wall part; and
the second fastening member is connected to the second wall part via the intermediary member.

5. The electrified vehicle according to claim 4, wherein:
the single case includes a cover that closes an opening of the case body on the side opposite to the engine and that is connected to the second wall part; and
a third connection part between the cover and the second wall part and a fourth connection part between the intermediary member and the second wall part are located at positions facing each other with the second wall part interposed between the third connection part and the fourth connection part, or the fourth connection part between the intermediary member and the second wall part and a fifth connection part between the intermediary member and the second fastening member are located at positions facing each other with the intermediary member interposed between the fourth connection part and the fifth connection part.

6. The electrified vehicle according to claim 1, wherein:
the case body includes a second wall part located on the side of the plate part opposite to the first wall part; and
the electromechanical integration unit is provided with a second fastening member that is fastened to the end of the plate part on the side opposite to the engine and is connected to the second wall part.

7. The electrified vehicle according to claim 6, further comprising:

an inverter; and a switching element, wherein:

the case body includes a protection plate connecting the first wall part and the second wall part; and the inverter and the switching element are provided on the protection plate and face the DC-DC converter.

8. An electrified vehicle comprising:

an engine;

an electric motor;

a power transmission device that transmits power from the electric motor to a drive wheel;

a drive battery; and a power control device that controls electric power that is transmitted and received between the drive battery and the electric motor, wherein:

a drive device including the electric motor and the power transmission device, and the power control device are housed in a single case as an electromechanical integration unit, and power from the engine is input to the electromechanical integration unit;

the single case includes a housing to which an engine block of the engine is connected and that houses a part of the power transmission device including a connecting member connected to a crankshaft of the engine, and a case body that includes a first wall part to which an end of the housing on a side opposite to the engine is connected and that houses the electromechanical integration unit excluding the part of the power transmission device;

the electromechanical integration unit includes a plate part that fixes at least a part of the power control device, and a first fastening member to which an end of the plate part on an engine side is fastened and that is connected to the first wall part;

a first connection part between the housing and the first wall part and a second connection part between the first fastening member and the first wall part are located at positions facing each other with the first wall part interposed between the first connection part and the second connection part;

the case body includes a second wall part located on the side of the plate part opposite to the first wall part; and the electromechanical integration unit is provided with a second fastening member that is fastened to the end of the plate part on the side opposite to the engine and is connected to the second wall part.

\* \* \* \* \*